(12) United States Patent
Ye et al.

(10) Patent No.: US 12,413,836 B2
(45) Date of Patent: Sep. 9, 2025

(54) CAMERA MODULE AND TERMINAL DEVICE

(71) Applicant: Huawei Technologies Co., Ltd., Shenzhen (CN)

(72) Inventors: Haishui Ye, Shanghai (CN); Qing Tong, Tokyo (JP); Heng Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 617 days.

(21) Appl. No.: 17/633,859

(22) PCT Filed: Aug. 5, 2020

(86) PCT No.: PCT/CN2020/106958
§ 371 (c)(1),
(2) Date: Feb. 8, 2022

(87) PCT Pub. No.: WO2021/027642
PCT Pub. Date: Feb. 18, 2021

(65) Prior Publication Data
US 2022/0337727 A1    Oct. 20, 2022

(30) Foreign Application Priority Data

Aug. 9, 2019   (CN) .......................... 201910734247.9
Nov. 29, 2019  (CN) .......................... 201911205850.4

(51) Int. Cl.
*G02B 9/62* (2006.01)
*G02B 13/00* (2006.01)
(Continued)

(52) U.S. Cl.
CPC .............. *H04N 23/55* (2023.01); *G02B 9/62* (2013.01); *G02B 13/0045* (2013.01); *G02B 13/06* (2013.01); *H04N 23/58* (2023.01)

(58) Field of Classification Search
CPC ........ G02B 9/62; G02B 9/64; G02B 13/0045; G02B 9/60
See application file for complete search history.

(56) References Cited

U.S. PATENT DOCUMENTS

| 8,009,366 B2 | 8/2011 | Hirose |
| 8,982,473 B2 | 3/2015 | Hsu et al. |

(Continued)

FOREIGN PATENT DOCUMENTS

| CN | 103777314 A | 5/2014 |
| CN | 105190395 A | 12/2015 |

(Continued)

OTHER PUBLICATIONS

Broemel, A. et al., "Freeform Surface Descriptions—Part 1: Mathematical Representations," Research Article, Advanced Optical Technologies, vol. 6, No. 5, 2017, 10 pages.

(Continued)

*Primary Examiner* — Ricky L Mack
*Assistant Examiner* — Journey F Sumlar
(74) *Attorney, Agent, or Firm* — SLATER MATSIL, LLP

(57) ABSTRACT

A camera module and a terminal device having the camera module, the camera module including a plurality of lenses, where lenses of the plurality of lenses are sequentially arranged from an object side to an image side along a direction of an optical axis, where at least one of the plurality of lenses is a free-form lens, where the free-form lens is a non-rotationally symmetric lens, where a first lens of the plurality of lenses is a lens of the plurality of lenses nearest the object side in a direction from the object side to the image side, where a distance on the optical axis between an object-side surface of the first lens and an imaging surface is TTL, where an effective focal length of the camera module is EFL, and TTL/EFL≤2.0.

19 Claims, 10 Drawing Sheets

(51) Int. Cl.
    *G02B 13/06*     (2006.01)
    *H04N 23/55*     (2023.01)
    *H04N 23/58*     (2023.01)

(56) References Cited

U.S. PATENT DOCUMENTS

| | | | |
|---|---|---|---|
| 9,581,795 | B2 | 2/2017 | Yatsu |
| 9,818,223 | B2 | 11/2017 | Zhu et al. |
| 2014/0254029 | A1 | 9/2014 | Hsu et al. |
| 2014/0327808 | A1 | 11/2014 | Chen et al. |
| 2016/0011401 | A1* | 1/2016 | Chen ............ G02B 13/0045 359/713 |
| 2016/0341935 | A1 | 11/2016 | Chen et al. |
| 2016/0377839 | A1* | 12/2016 | Chen ............ G02B 13/0045 359/708 |
| 2017/0212334 | A1 | 7/2017 | Imaoka |
| 2017/0307855 | A1 | 10/2017 | Lu |
| 2017/0315333 | A1 | 11/2017 | Hsu et al. |
| 2018/0259744 | A1* | 9/2018 | Pao ............ G02B 9/62 |
| 2022/0091369 | A1 | 3/2022 | Zhong et al. |

FOREIGN PATENT DOCUMENTS

| | | | | |
|---|---|---|---|---|
| CN | 105335335 | A | 2/2016 | |
| CN | 104105991 | B * | 6/2017 | ......... G02B 13/0045 |
| CN | 109116527 | A | 1/2019 | |
| CN | 109283665 | A | 1/2019 | |
| CN | 109375349 | A | 2/2019 | |
| CN | 109407277 | A | 3/2019 | |
| CN | 109407278 | A | 3/2019 | |
| CN | 109407280 | A | 3/2019 | |
| CN | 109445072 | A | 3/2019 | |
| CN | 109459840 | A | 3/2019 | |
| CN | 109471247 | A | 3/2019 | |
| CN | 109521554 | A | 3/2019 | |
| CN | 109541783 | A | 3/2019 | |
| CN | 109597188 | A | 4/2019 | |
| CN | 109613685 | A | 4/2019 | |
| CN | 209132499 | U | 7/2019 | |
| CN | 209388016 | U | 9/2019 | |
| JP | 2000019408 | A | 1/2000 | |
| JP | 2002090692 | A | 3/2002 | |
| JP | 2004258218 | A | 9/2004 | |
| JP | 2009080407 | A | 4/2009 | |
| JP | 4748220 | B2 | 8/2011 | |
| JP | 2012133175 | A | 7/2012 | |
| JP | 2015121730 | A | 7/2015 | |
| JP | 2015158571 | A | 9/2015 | |
| JP | 2015176043 | A | 10/2015 | |
| JP | 2016014758 | A | 1/2016 | |
| JP | 2016014759 | A | 1/2016 | |
| JP | 2016148725 | A | 8/2016 | |
| JP | 2017134394 | A | 8/2017 | |
| JP | 2019003059 | A | 1/2019 | |
| JP | 2019105719 | A | 6/2019 | |
| WO | 2014155468 | A1 | 10/2014 | |

OTHER PUBLICATIONS

Liu, Jun et al., Chinese Doctoral Dissertation & Master's Theses Full-Text Database (Doctor), Basic Sciences, Study on Free-form Surface in Imaging Optical System, Doctoral Thesis: Graduate School of Chinese Academy of Sciences (Changchun Institute of Optics, Precision Machinery and Physics), 2016, with the related parts and the translation, 55 pages.

Na, L. et al., "Design of Large-Field and Low-Distortion Freeform Space Optical System with 3D Construction Method," Beijing Institute of Space Mechanics & Electricity, 2016, 9 pages.

* cited by examiner

CAMERA MODULE AND TERMINAL DEVICE

CROSS REFERENCE TO RELATED APPLICATIONS

This application is a national stage of International Application No. PCT/CN2020/106958, filed on Aug. 5, 2020, which claims priority to Chinese Patent Application No. 201911205850.4, filed on Nov. 29, 2019 and Chinese Patent Application No. 201910734247.9, filed on Aug. 9, 2019. All of the aforementioned applications are hereby incorporated by reference in their entireties.

TECHNICAL FIELD

This application belongs to the field of optical imaging technologies, and in particular, to a camera module and a terminal device of a photographic optical system.

BACKGROUND

With the popularity of mobile terminal devices, photography technologies for users to obtain images have developed rapidly. To meet a wide range of market needs, large sensor sizes, large apertures, a diversity of fields of view, and compact structures are important development trends for camera modules. From single-camera modules, to dual-camera modules, and to multi-camera modules, a combination of a plurality of field-of-view lenses has been implemented. This also allows ultra wide-angle lens sets to be applied to mobile terminal devices.

Ultra wide-angle lenses have larger fields of view, but it is difficult to balance a contradiction between an optical distortion and a compact structure. Therefore, most ultra wide-angle lenses have relatively large optical distortions, and a TV distortion of an image is also very obvious. In the field of mobile electronic camera modules limited by compact structures, an optical distortion problem is more prominent and is difficult to resolve. In addition, in application of terminal devices, during video recording by using an ultra wide-angle lens, real-time distortion correction for a video image consumes a large quantity of processing resources and is difficult to achieve.

How to resolve the optical distortion problem of the ultra wide-angle lens set should be a direction of research and development in the industry.

SUMMARY

Embodiments of this application provide a camera module and a terminal device. The camera module is an ultra wide-angle lens, and a non-rotationally symmetric free-form lens is introduced into the lens, to resolve an optical distortion problem of the ultra wide-angle lens, implement an ultra wide-angle and low-distortion imaging effect, and provide a user with good experience.

According to a first aspect, this embodiment provides a camera module, applied to a terminal device, and includes a plurality of lenses sequentially arranged from an object side to an image side along a direction of an optical axis. A quantity of the lenses may be three, four, five, six, seven, or the like. At least one lens of the plurality of lenses is a free-form lens. The free-form lens is a non-rotationally symmetric lens, the $1^{st}$ lens in the plurality of lenses in a direction from the object side to the image side is a first lens, a distance on the optical axis between an object-side surface of the first lens and an imaging surface is TTL, an effective focal length of the camera module is EFL, and TTL/EFL≤2.0, to implement relatively short TTL. The distance on the optical axis between the object side surface of the first lens and the imaging surface is TTL, which is specifically a distance between an intersection of an object-side surface of the first lens and the optical axis and an intersection of the imaging surface and the optical axis. In this application a surface type of the free-form lens is non-rotationally symmetric. The non-rotationally symmetric free-form lens can increase freedom of optical design of the camera module, and a rectangular imaging region can be implemented without limiting an imaging region to being a rotationally symmetric image circle. An electronic image sensor is arranged on the imaging surface, and is specifically a sensor chip of a camera in the terminal device. In this application, at least one lens is limited to being a free-form lens, to suppress an optical distortion problem of the camera module. An imaging effect of the camera module can be ensured even in the case of an ultra wide angle. In addition, a relatively short total length of the camera module can be obtained. In other words, the non-rotationally symmetric free-form lens is introduced into the camera module, so that an ultra wide-angle and low-distortion imaging effect can be implemented, that is, a system aberration of the camera module can be reduced or minimized, to implement functions of aberration correction and distortion reduction. In addition, the free-form lens can further reduce TTL of the camera module, so that the camera module has a compact structure.

In a possible implementation, an X-axis and the optical axis form a first plane, a Y-axis and the optical axis form a second plane, and the X-axis and the Y-axis are two central axes that are perpendicular to each other on the imaging surface of the camera module. An intersection of the X-axis and the Y-axis is located on the optical axis. The free-form lens is a centrosymmetric structure by using the first plane as a center, and the free-form lens is also a centrosymmetric structure by using the second plane as a center. Symmetry of the free-form lens in a direction of the X-axis and in a direction of the Y-axis helps ensure imaging quality. The imaging region of the electronic sensor is rectangular. Symmetry of the free-form lens in the direction of the X-axis and in the direction of the Y-axis makes imaging quality of the imaging region keep particular symmetry. This helps implement that imaging quality of a middle region close to the optical axis is better than imaging quality of an edge region away from the optical axis.

In a possible implementation, an object-side surface or an image-side surface of the free-form lens or both are free-form surfaces, and a surface type expression of the free-form surface is:

$$z = \frac{cr^2}{1+\sqrt{1-(1+k)c^2r^2}} + \sum_{i=1}^{M} A_i E_i$$

z is a sag of an optical surface, and z is an expression of x and y; k is a conic coefficient; c is a curvature radius; r is a radius height in the direction of the optical axis; $r^2 = x^2 + y^2$; $A_i$ is a polynomial coefficient; and $E_i$ is a monomial of an X-axis coordinate and a Y-axis coordinate. Directions of the x-axis and the y-axis herein are consistent with the foregoing directions of the X-axis and the Y-axis about which the free-form lens is symmetric.

$$\sum_{i=1}^{M} A_i E_i = A_1 x^0 y^2 + A_2 x^2 y^0 + A_3 x^2 y^2 +$$
$$A_4 x^4 y^0 + A_5 x^0 y^4 + A_6 x^6 y^0 + A_7 x^0 y^6 + A_8 x^4 y^2 + A_9 x^4 y^2 + \ldots$$

Exponents of x and y in $E_i$ of the surface type expression of the free-form lens are both even numbers, x is an X-axis coordinate, and y is a Y-axis coordinate, so that the surface type of the free-form lens has symmetry. Specifically, the exponents of x and y in $E_i$ of the surface type expression of free-form lens are both even numbers. This can make the surface type of the free-form lens better symmetric, and facilitate lens processing and detection.

In a second implementation, an object-side surface or an image-side surface of the free-form lens or both are free-form surfaces, and a surface type expression of the free-form lens is:

$$z = \frac{cr^2}{1 + \sqrt{1 - (1+k)c^2 r^2}} + \sum_{i=1}^{M} A_i E_i$$

z is a sag of an optical surface, and z is an expression of x and y; k is a conic coefficient; c is a curvature radius; r is a radius height in the direction of the optical axis; $r^2 = x^2 + y^2$; $A_i$ is a polynomial coefficient; and $E_i$ is a monomial of an X-axis coordinate and a Y-axis coordinate.

$$\sum_{i=1}^{M} A_i E_i = A_1 |x^1 y^0| + A_2 |x^0 y^1| + A_3 |x^1 y^1| + A_4 |x^0 y^2| +$$
$$A_5 |x^3 y^0| + A_6 |x^2 y^1| + A_7 |x^1 y^2| + A_8 |x^0 y^3| + A_9 |x^4 y^0| + \ldots$$

$A_i$ is a polynomial coefficient, x is an X-axis coordinate, and y is a Y-axis coordinate.

In a third implementation, an object-side surface or an image-side surface of the free-form lens or both are free-form surfaces, and a surface type expression of the free-form lens is:

$$z = \frac{c_x x^2 + c_y y^2}{1 + \sqrt{1 - (1+k_x)c_x^2 x^2 - (1+k_y)c_y^2 y^2}} + \sum_{i=1}^{M} A_i |x^i| + \sum_{i=1}^{M} B_i |y^i|$$

z is a sag of an optical surface, and z is an expression of x and y; x is an x-axis coordinate, and y is a Y-axis coordinate; $k_x$ and $k_y$ are conic coefficients; $c_x$ and $c_y$ are curvature radii; and $A_i$ and $B_i$ are polynomial coefficients.

In a possible implementation, the X-axis and the Y-axis are two central axes passing through a center of the imaging surface and respectively parallel to a long side and a short side of the imaging surface.

In a possible implementation, a quantity of the plurality of lenses is N, N≥3, and the plurality of lenses include the first lens to the $N^{th}$ lens sequentially arranged in the direction from the object side to the image side; and surface types of object-side surfaces and image-side surfaces of the first lens to the $(N-1)^{th}$ lens are all aspheric surfaces, and the $N^{th}$ lens is a free-form lens. A quantity of lenses used in an embodiment of this application is six. In another implementation, the quantity of lenses may be seven, eight, or the like. In an actual implementation process, a camera module including three, four, or five lenses may be disposed as required. The free-form lens is introduced into the camera module, so that a visual effect without image distortion is achieved for an ultra wide-angle lens set, and imaging quality unachievable by ordinary aspheric optical design can be achieved.

In a possible implementation, a half of a diagonal length of an effective pixel region of the imaging surface of the camera module is ImgH, and TTL/ImgH≤2.0, to help limit a total system length of the camera module, so that the camera module has a compact structure and meets a design requirement for a portable device.

In a possible implementation, an entrance pupil diameter of the camera module is EPD, and EFL/EPD≤2.2. In this implementation, EPD/EPD≤2.2 is used for limitation, so that an f-number of the camera module is limited, which is conducive to imaging quality.

In a possible implementation, a field of view of the camera module is FOV, FOV≥100 deg, and EFL<20 mm. The camera module has an ultra wide-angle imaging effect. In this implementation, the free-form lens is introduced into the camera module, to achieve a short-focal-length, large-field-of-view, and low-distortion imaging effect for the ultra wide-angle lens set. In addition, a relatively short total length of the camera module is obtained, and a compact structure of the ultra wide-angle lens set is implemented.

In a possible implementation, the quantity of the plurality of lenses is N, and the first three lenses arranged sequentially in the direction from the object side to the image side are respectively the first lens, a second lens, and a third lens. The camera module further includes a vignetting stop, and the vignetting stop is disposed on an object side of the second lens or on an object side of the third lens. The vignetting stop can intercept an imaging ray with a large aberration (also referred to as intercepting a ray of a point beyond the axis), to improve imaging quality. The vignetting stop is arranged close to a middle position of the camera module, to help balance a comprehensive aberration of the camera module.

In a possible implementation, the lens adjacent to the imaging surface in the plurality of lenses is the free-form lens, a curvature radius of the object-side surface of the free-form lens is R61, and a curvature radius of the image-side surface of the free-form lens is R62. The following condition is met: |f/R61|+|f/R62|<2, to help correct the comprehensive aberration of the camera set. When | f/R61|+ |f/R62| is greater than or equal to 2, it does not help correct the comprehensive aberration of the camera module, and an imaging effect is affected.

In a possible implementation, the camera module further includes an infrared filter element located between the plurality of lenses and the imaging surface. The infrared filter element can effectively alleviate color cast generated around an image.

Optical design of the free-form lens can reduce the quantity of lenses of the camera module, and decrease a weight of the camera module, thereby facilitating a light-weight implementation. A flexible spatial layout and design freedom of the free-form lens simplify a structure of the camera module. The optical design of the free-form lens increases freedom of optimization, and helps control the system aberration of the camera module and improve overall quality of the camera module.

In a possible implementation, the camera module further includes an electronic image sensor, the electronic image sensor is disposed on the imaging surface, and the imaging surface of the camera module is a rectangular region, which matches an image sensing area of the electronic image sensor and is not less than the image sensing area of the electronic image sensor. In other words, the electronic image sensor is rectangular, and the imaging surface of the camera module using the free-form lens is a rectangular region, to match the image sensor, and improve imaging quality.

In a possible implementation, a diagonal length of the image sensing surface of the electronic image sensor is not less than 5.5 mm. For image sensors with same effective pixels, generally, a larger size of an image sensor indicates a larger unit area of each pixel, higher performance, more image details that can be recorded. In this implementation, the diagonal length of the image sensing surface is limited to being not less than 5.5 mm. This can ensure that the camera module applied to a mobile terminal has high image sensing performance, and provides high image quality.

According to a second aspect, this application provides a terminal device, including the camera module according to any one of the foregoing implementations.

In this application, the non-rotationally symmetric free-form lens is introduced into the lens set, to resolve an optical distortion problem of the ultra wide-angle lens set, eliminate impact of imaging distortion of the camera module, improve user experience, and obtain excellent optical quality.

BRIEF DESCRIPTION OF THE DRAWINGS

To describe the technical solutions in the embodiments of this application or the background more clearly, the following describes the accompanying drawings required for use in the embodiments of this application or the background.

DETAILED DESCRIPTION OF ILLUSTRATIVE EMBODIMENTS

The following describes the embodiments of this application with reference to the accompanying drawings in the embodiments of this application.

Figure 1:
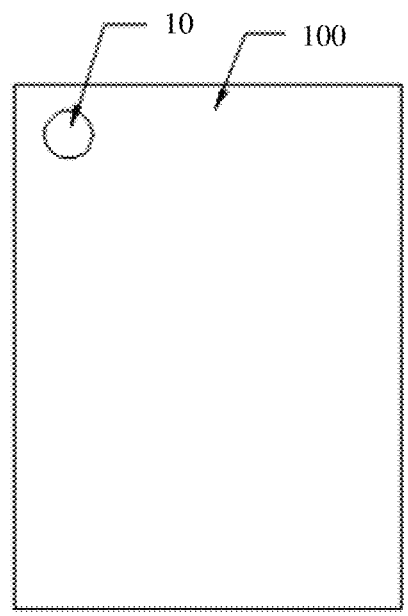
FIG. 1 is a schematic diagram of a camera module applied to a terminal device according to this application.

Refer to FIG. 1. A camera module 10 in this application is applied to a terminal device 100. The terminal device 100 may be a portable terminal such as a mobile phone or a tablet, and the camera module 10 may be an ultra wide-angle lens set. The camera module 10 is assembled inside the terminal device 100, and may be a rear camera or a front camera of the terminal device 100, or a retractable camera that may extend out of a housing of the terminal device 100.

In an implementation, the camera module provided in this application includes six lenses (six lenses are used as a specific embodiment for description, and a quantity of lenses is not limited in this application). The six lenses are sequentially distributed from an object side to an image side along a direction of an optical axis as follows: a first lens, a second lens, a third lens, a fourth lens, a fifth lens, and a sixth lens. The quantity of the lenses is not limited to six, and may be another quantity, such as three, four, five, seven. At least one lens of the plurality of lenses is a free-form lens, and the free-form lens is a non-rotationally symmetric surface type. The non-rotationally symmetric free-form lens can increase freedom of optical design of the camera module. A distance on the optical axis between an object-side surface of the first lens and an imaging surface is TTL, an effective focal length of the camera module is EFL, and TTL/EFL≤2.0, to implement relatively short TTL, thereby facilitating a compact structure of the camera module. At least one lens is limited to being a non-rotationally symmetric free-form surface, so that an optical distortion problem of the ultra wide-angle lens set can be alleviated, and the camera module has a compact structure, thereby improving user experience. Aspheric curve equation of lenses 1 to 5 is as follows:

$$z = \frac{cr^2}{1+\sqrt{1-(1+k)c^2r^2}} + \sum_{i=1}^{M} \alpha_i \rho^i$$

z is a sag of an optical surface, and z is an expression of x and y; k is a conic coefficient; c is a curvature radius; r is a radius height in the direction of the optical axis; $r^2=x^2+y^2$; x is an X-axis coordinate, and y is a Y-axis coordinate; is a polynomial coefficient; and $\rho_i$ is a normalized radial coordinate.

In this application, a surface type expression (three different surface type expressions are listed below) of the free-form lens is defined, to implement symmetry of the free-form lens in a direction of an X-axis and a direction of a Y-axis. The direction of the X-axis and the direction of the Y-axis are two directions perpendicular to each other on the imaging surface of the camera module.

In a first implementation, a surface type expression (namely, a free-form sphere curve equation) of the non-rotationally symmetric free-form lens is expressed as follows:

$$z = \frac{cr^2}{1+\sqrt{1-(1+k)c^2r^2}} + \sum_{i=1}^{M} A_i E_i$$

z is a sag of an optical surface, and z is an expression of x and y; k is a conic coefficient; c is a curvature radius; r is a radius height in the direction of the optical axis; $r^2=x^2+y^2$; $A_i$ is a polynomial coefficient; and $E_i$ is a monomial of an X-axis coordinate and a Y-axis coordinate. Directions of the x-axis and the y-axis herein are consistent with the foregoing directions of the X-axis and the Y-axis about which the free-form lens is symmetric.

$$\sum_{i=1}^{N} A_i E_i = A_1 x^0 y^2 + A_2 x^2 y^0 + A_3 x^2 y^2 +$$

-continued
$$A_4 x^4 y^0 + A_5 x^0 y^4 + A_6 x^6 y^0 + A_7 x^0 y^6 + A_8 x^4 y^2 + A_9 x^4 y^2 + \ldots$$

$A_i$ is a polynomial coefficient.

Exponents of x and y in $E_i$ of the surface type expression of the free-form lens are both even numbers, x is an X-axis coordinate, and y is a Y-axis coordinate, so that the surface type of the free-form lens has symmetry.

In a second implementation, a surface type expression of the free-form lens is:

$$z = \frac{cr^2}{1 + \sqrt{1 - (1+k)c^2 r^2}} + \sum_{i=1}^{M} A_i E_i$$

z is a sag of an optical surface, and z is an expression of x and y; k is a conic coefficient; c is a curvature radius; r is a radius height in the direction of the optical axis; $r^2 = x^2 + y^2$; $A_i$ is a polynomial coefficient; and $E_i$ is a monomial of an X-axis coordinate and a Y-axis coordinate.

$$\sum_{i=1}^{N} A_i E_i = A_1 |x^1 y^0| + A_2 |x^0 y^1| + A_3 |x^1 y^1| + A_4 |x^0 y^2| +$$
$$A_5 |x^3 y^0| + A_6 |x^2 y^1| + A_7 |x^1 y^2| + A_8 |x^0 y^3| + A_9 |x^4 y^0| + \ldots$$

$A_i$ is a polynomial coefficient, x is an X-axis coordinate, and y is a Y-axis coordinate.

In a third implementation, a surface type expression of the free-form lens is:

$$z = \frac{c_x x^2 + c_y y^2}{1 + \sqrt{1 - (1 + k_x) c_x^2 x^2 - (1 + k_y) c_y^2 y^2}} + \sum_{i=1}^{M} A_i |x^i| + \sum_{i=1}^{M} B_i |y^i|$$

z is a sag of an optical surface; x is an X-axis coordinate, and y is a Y-axis coordinate; $k_x$ and $k_y$ are conic coefficients; $c_x$ and $c_y$ are curvature radii; and $A_i$ and $B_i$ are polynomial coefficients.

In the foregoing implementations, the free-form lens may have one surface that is a free-form surface, for example, an object-side surface or an image-side surface is a free-form surface, or both the surfaces may be free-form surfaces, that is, both the object-side surface and the image-side surface are free-form surfaces.

Figure 1A:
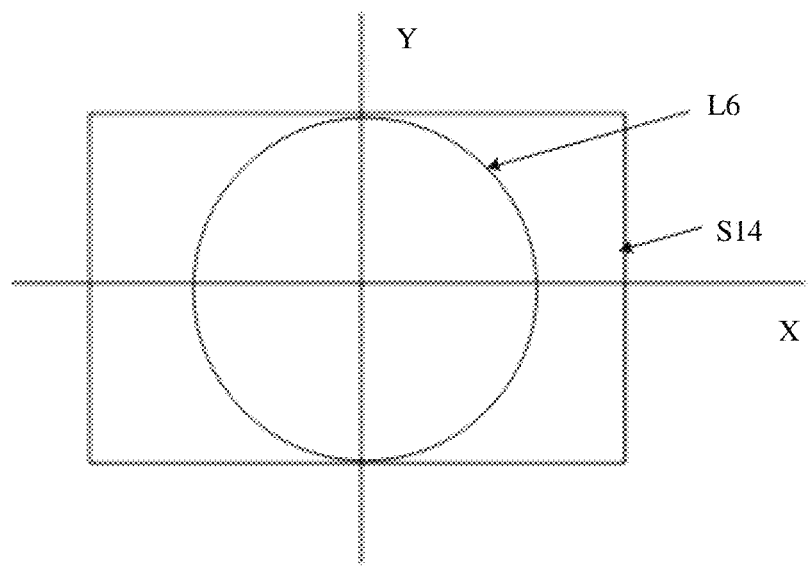
FIG. 1a is a schematic diagram of a free-form lens that has line symmetry in a direction of an X-axis and in a direction of a Y-axis.

In an implementation, FIG. 1a is a schematic diagram of a free-form lens that is symmetric in a direction of an X-axis and in a direction of a Y-axis, an imaging surface S14 is a rectangular region, and the X-axis and the Y-axis are two central axes perpendicular to each other on the imaging surface S14. An intersection of the X-axis and the Y-axis is located on an optical axis. Specifically, the direction of the X-axis is a central axis that passes through a center of the rectangular imaging surface S14 and is parallel to a long side of the rectangular imaging surface S14. The direction of the Y-axis is a central axis that passes through the center of the rectangular imaging surface S14 and is parallel to a short side of the rectangular imaging surface S14. The X-axis and the optical axis form a first plane, and the Y-axis and the optical axis form a second plane. The free-form lens L6 is a centrosymmetric structure by using the first plane as a center, and the free-form lens is also a centrosymmetric structure by using the second plane as a center. Keeping the free-form lens L6 centrosymmetric with respect to the first plane and centrosymmetric with respect to the second plane helps ensure imaging quality, and helps implement that imaging quality of a middle region close to the optical axis is better than imaging quality of an edge region away from the optical axis.

The following describes this application in detail by using three specific embodiments.

Embodiment 1

Figure 2A:
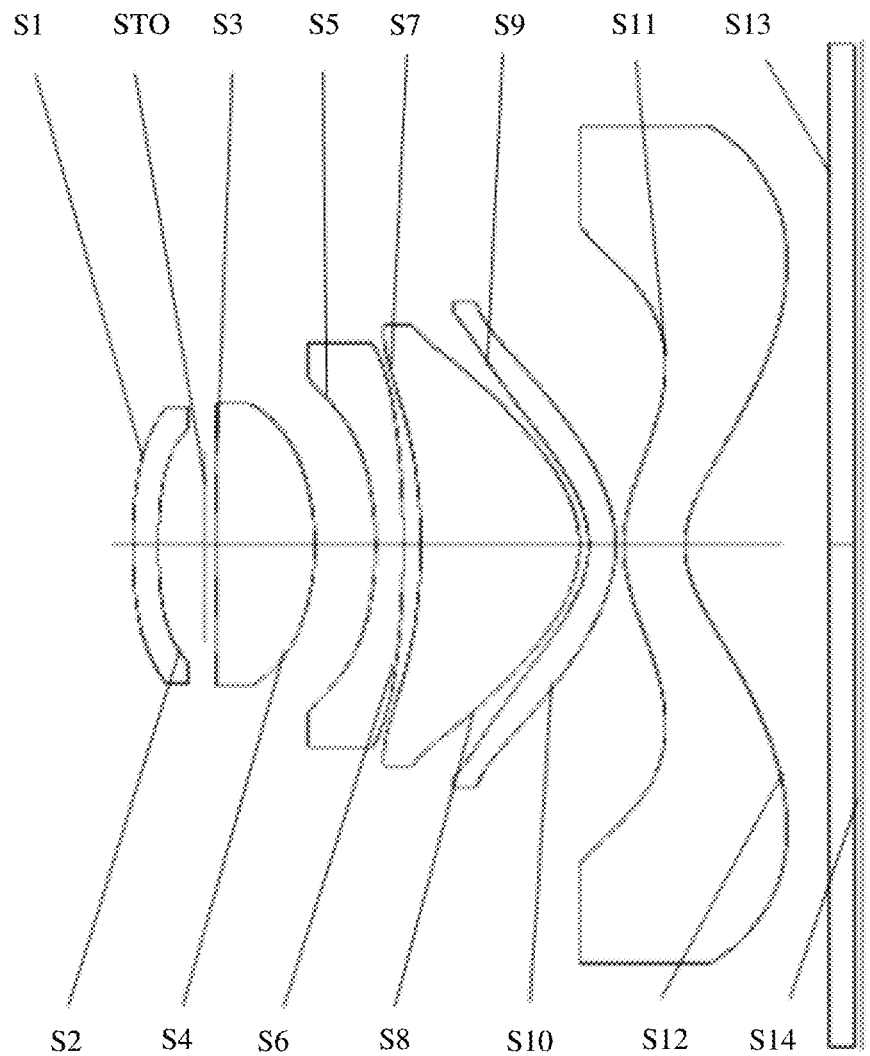
FIG. 2a and FIG. 2b are schematic diagrams of a camera module according to Embodiment 1 of this application.
Figure 2B:
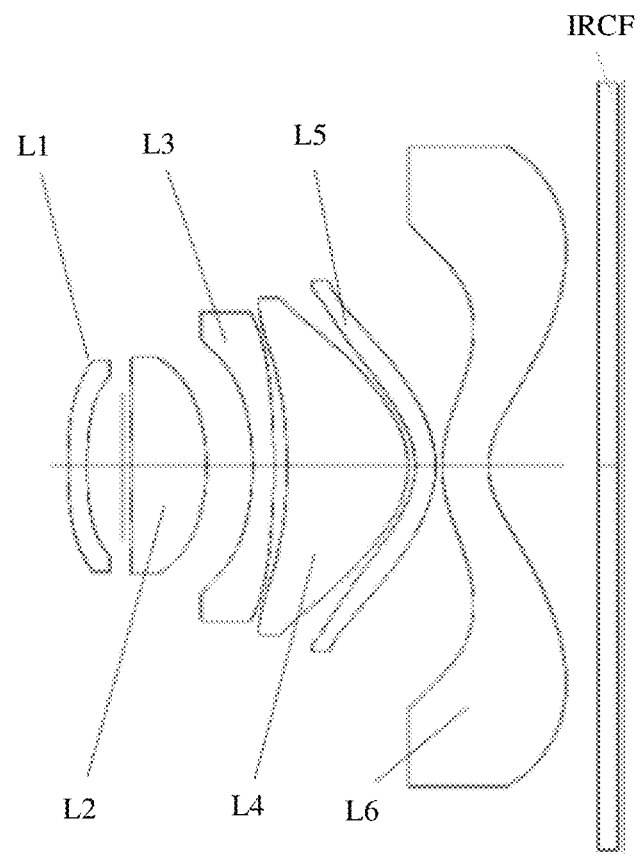

As shown in FIG. 2a and FIG. 2b, a straight line in the middle represents an optical axis, a left side of a camera module is an object side, and a right side of the camera module is an image side. In the camera module provided in this embodiment, a first lens L1, a stop STO, a second lens L2, a third lens L3, a fourth lens L4, a fifth lens L5, a sixth lens L6, an infrared filter element IRCF, and an electronic image sensor are sequentially arranged along the optical axis from the object side to the image side. The electronic image sensor may be placed at a position of an imaging surface S14. In this implementation, the stop STO is placed after the first lens L1, and is close to a middle position of the camera module, to help balance an aberration of the camera module.

The first lens L1 has a positive refractive power and is made of a resin material. A region, near the optical axis, of an object-side surface S1 of the first lens L1 is convex. A region, near the optical axis, of an image-side surface S2 of the first lens L1 is convex. Both the regions are aspheric surfaces.

The second lens L2 has a positive refractive power and is made of a resin material. A region, near the optical axis, of an object-side surface S3 of the second lens L2 is convex. A region, near the optical axis, of an image-side surface S4 of the second lens L2 is concave. Both the regions are aspheric surfaces.

The third lens L3 has a negative refractive power and is made of a resin material. A region, near the optical axis, of an object-side surface S5 of the third lens L3 is concave. A region, near the optical axis, of an image-side surface S6 of the third lens L3 is concave. Both the regions are aspheric surfaces.

The fourth lens L4 has a positive refractive power and is made of a resin material. A region, near the optical axis, of an object-side surface S7 of the fourth lens L4 is concave. A region, near the optical axis, of an image-side surface S8 of the fourth lens L4 is concave. Both the regions are aspheric surfaces.

The fifth lens L5 has a negative refractive power and is made of a resin material. A region, near the optical axis, of an object-side surface S9 of the fifth lens L5 is concave. A region, near the optical axis, of an image-side surface S1lo of the fifth lens L5 is concave. Both the regions are aspheric surfaces.

The sixth lens L6 has a negative refractive power and is made of a resin material. A region, near the optical axis, of an object-side surface S11 of the sixth lens L6 is concave. A region, near the optical axis, of an image-side surface S12 of the sixth lens L6 is convex. Both the regions are free-form surfaces.

An object-side surface S13 and an image-side surface S14 of the infrared filter element IRCF are both flat surfaces.

In Embodiment 1, a distance on the optical axis between the object-side surface S1 of the first lens L1 and an imaging surface S14 of an infinitely far-away object is TTL, and an effective focal length of the camera module is EFL. The following condition can be met: TTL/EFL≤2.0, to implement shorter TTL, thereby facilitating miniaturization design of the camera module, saving internal space of a terminal device, and facilitating thinning development of the terminal device.

In Embodiment 1, the exponents of x and y in $E_i$ of the surface type expression of the free-form surface of the sixth lens L6 are both even numbers. This can make the surface type of the lens better symmetric, and facilitate lens processing and detection.

In an extension of Embodiment 1, optionally, a vignetting stop ST1 (not shown) may be disposed before (namely, on the object side of) the first lens L1, and a vignetting stop ST2 (not shown) may be disposed after (on the image side of) the sixth lens L6, to effectively reduce a diameter of the camera module.

In Embodiment 1, a focal length of the camera module is f, a curvature radius of the object-side surface S11 of the sixth lens L6 is R61, and a curvature radius of the image-side surface S12 of the sixth lens L6 is R62. The following condition is met: |f/R61|+|f/R62|=1.37, to help correct a comprehensive aberration of a camera set, so that a lateral chromatic aberration of the camera module is less than $3$ um and a distortion is less than 2%.

Table 1a is a table showing characteristics of an optical system in this embodiment. A curvature radius and a thickness are both expressed in millimeters (mm).

TABLE 1a

| Surface number | Surface type | Curvature radius | Thickness | Material | Refractive index | Dispersion coefficient |
|---|---|---|---|---|---|---|
| S1 | Aspheric surface | 5.5545 | 0.2145 | Resin | 1.65 | 22.9 |
| S2 | Aspheric surface | 43.3006 | 0.3991 | | | |
| STO | Flat surface | Infinite | 0.0856 | | | |
| S3 | Aspheric surface | 72.4020 | 0.8450 | Resin | 1.54 | 56 |
| S4 | Aspheric surface | −2.2277 | 0.5156 | | | |
| S5 | Aspheric surface | −4.1395 | 0.2371 | Resin | 1.65 | 22.9 |
| S6 | Aspheric surface | −6.0243 | 0.1468 | | | |
| S7 | Aspheric surface | −12.8096 | 1.3511 | Resin | 1.54 | 56 |
| S8 | Aspheric surface | −1.5405 | 0.0811 | | | |
| S9 | Aspheric surface | −1.3990 | 0.2261 | Resin | 1.65 | 22.9 |
| S10 | Aspheric surface | −1.7201 | 0.0691 | | | |
| S11 | Extended aspheric surface | −3.2543 | 0.5182 | Resin | 1.65 | 22.9 |
| S12 | Extended aspheric surface | 0.5324 | 1.2303 | | | |
| S13 | Flat surface | Infinite | 0.2184 | Glass | 1.52 | 54.5 |
| | Flat surface | Infinite | 0.0520 | | | |
| S14 | Flat surface | Infinite | 0.0000 | | | |

Table 1b gives conic coefficients k and polynomial coefficients a1, a2, a3, a4, a5, a6, a7, a8, a9, a10, a11, a12, a13, a14, and a15 that can be used for aspheric lenses surfaces S1 to S10 in Embodiment 1.

TABLE 1b

| Parameter | S1 | S2 | S3 | S4 | S5 | S6 | S7 | S8 | S9 | S10 |
|---|---|---|---|---|---|---|---|---|---|---|
| K | −89.0714 | 130.6859 | −4655.9692 | −0.5553 | 6.5588 | 0.9185 | 45.9472 | −0.7741 | −0.6498 | −0.4395 |
| a1 | 0.0000 | 0.0000 | 0.0000 | 0.0000 | 0.0000 | 0.0000 | 0.0000 | 0.0000 | 0.0000 | 0.0000 |
| a2 | −0.0152 | 0.2774 | 0.1147 | −0.0006 | −0.1417 | 0.1306 | −0.1796 | −0.7795 | −0.8846 | −0.6002 |
| a3 | 0.3160 | 0.3257 | −0.0143 | 0.0382 | −0.0718 | −0.1298 | −0.0613 | 0.2977 | 0.7433 | 0.6135 |
| a4 | 0.1162 | −0.2224 | −0.1036 | −0.7000 | −0.1193 | 0.0432 | 0.1270 | 0.4062 | 0.6841 | 0.3106 |
| a5 | 1.3304 | 1.3382 | −0.0501 | 0.5297 | −0.1721 | 0.1261 | −0.3324 | 0.2381 | 0.0375 | −0.3944 |
| a6 | −0.2317 | 3.3063 | −0.0793 | −0.6215 | −0.1170 | 0.0307 | −0.2253 | −0.0309 | −0.0484 | −0.0173 |
| a7 | −1.3109 | −0.8758 | −0.4983 | −0.1927 | −0.0370 | −0.0910 | 0.2503 | −0.2238 | −0.0885 | 0.0731 |
| a8 | 0.6204 | −11.8832 | −0.4727 | −0.3596 | −0.0438 | −0.1312 | 0.7093 | −0.2444 | −0.2185 | 0.1842 |
| a9 | −0.8465 | −2.1909 | 0.3526 | −1.7055 | −0.1584 | −0.1027 | 0.2254 | −0.1653 | 0.0489 | 0.0459 |
| a10 | −0.6141 | 41.7733 | −4.2841 | −0.1863 | −0.2957 | −0.0327 | −0.6322 | −0.0264 | 0.1733 | −0.0481 |
| a11 | 3.1749 | −7.4454 | 1.0910 | −1.6257 | −0.3721 | 0.0085 | −0.1870 | 0.0887 | 0.0527 | 0.0010 |

TABLE 1b-continued

| Parameter | S1 | S2 | S3 | S4 | S5 | S6 | S7 | S8 | S9 | S10 |
|---|---|---|---|---|---|---|---|---|---|---|
| a12 | 5.3311 | −45.5026 | 4.8330 | −4.4567 | −0.2846 | 0.0541 | −0.1634 | 0.1337 | 0.0051 | −0.0070 |
| a13 | 3.6623 | 33.6188 | −0.5357 | 15.8836 | 0.0727 | 0.0683 | 0.0005 | 0.1275 | −0.0144 | −0.0087 |
| a14 | −0.9079 | 85.3587 | 15.6750 | 19.4730 | 0.7811 | 0.0624 | 0.2713 | 0.0584 | −0.0541 | −0.0043 |
| a15 | −12.2109 | 97.2852 | −157.7664 | −8.8749 | 1.9354 | 0.0098 | 0.4500 | −0.0086 | −0.0277 | 0.0034 |

Table 1c gives conic coefficients k and higher-order term coefficients X2Y0, X0Y2, X4Y0, X2Y2, X0Y4, X6Y0, X4Y2, X2Y4, X0Y6, X8Y0, X6Y2, X4Y4, X2Y6, and X0Y8 that can be used for the free-form surfaces S11 and S12 in Embodiment 1.

TABLE 1c

| Parameter | S11 | S12 |
|---|---|---|
| K | −0.2054 | −1.4469 |
| X2Y0 | 1.7232 | −1.0737 |
| X0Y2 | 1.7480 | −1.0137 |
| X4Y0 | −1.5261 | 0.0639 |
| X2Y2 | −3.0799 | −0.0764 |
| X0Y4 | −1.4951 | −0.0559 |
| X6Y0 | 1.1911 | −0.0397 |
| X4Y2 | 3.4068 | 0.2676 |
| X2Y4 | 3.0357 | 0.3088 |
| X0Y6 | 0.8664 | 0.0968 |
| X8Y0 | −0.7572 | 0.0372 |
| X6Y2 | −2.6574 | −0.1552 |
| X4Y4 | −2.2974 | −0.2318 |
| X2Y6 | −1.3632 | −0.2295 |
| X0Y8 | −0.1705 | −0.0414 |

Figure 2C:
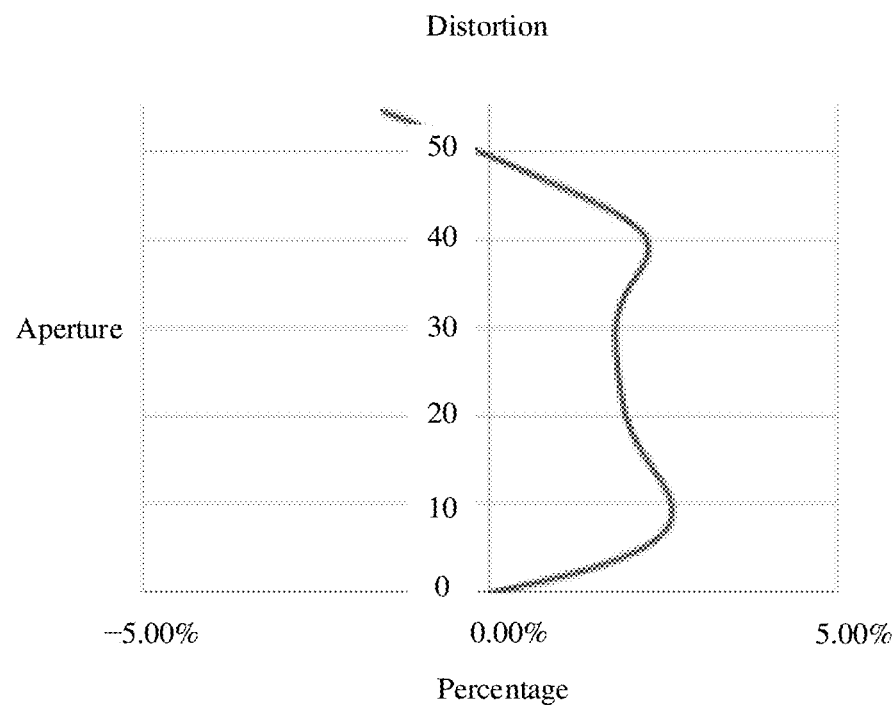
FIG. 2C is a distortion curve of an optical system in Embodiment 1.

FIG. 2C shows a distortion curve of the optical system in Embodiment 1, which represents distortion values corresponding to different fields of view.

Figure 2D:
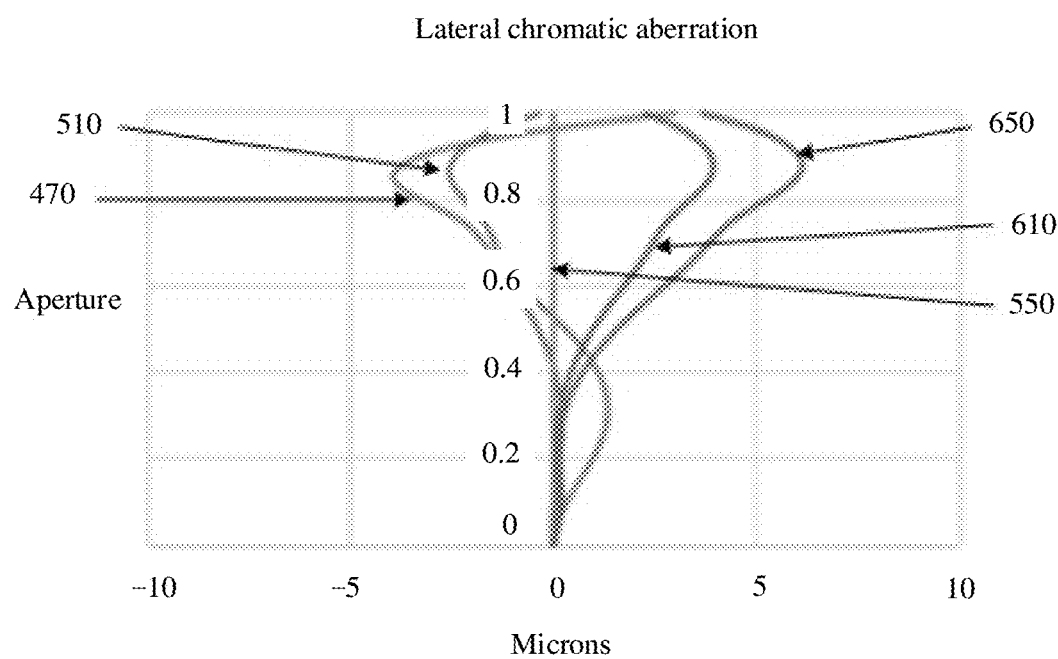
FIG. 2d is a lateral chromatic aberration curve of an optical system in Embodiment 1.

FIG. 2d shows a lateral chromatic aberration curve of the optical system in Embodiment 1, which represents lateral chromatic aberration values corresponding to five different wavelengths of light at different fields of view. Arrow indication lines are used to represent the five different wavelengths of light. The wavelengths are 510 nanometers, 470 nanometers, 610 nanometers, 550 nanometers, and 650 nanometers, respectively.

It can be learned from FIG. 2c and FIG. 2d that the optical system provided in Embodiment 1 can achieve good imaging quality.

Embodiment 2

Figure 3A:
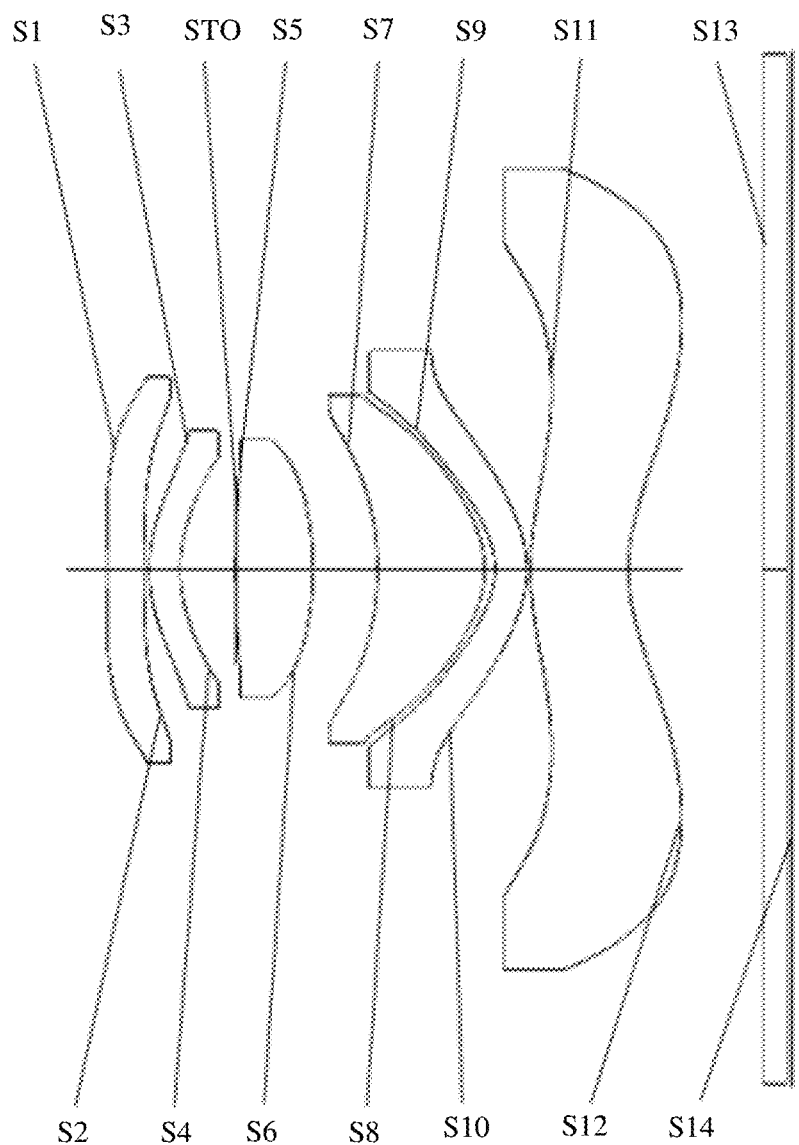
FIG. 3a and FIG. 3b are schematic diagrams of a camera module according to Embodiment 2 of this application.
Figure 3B:
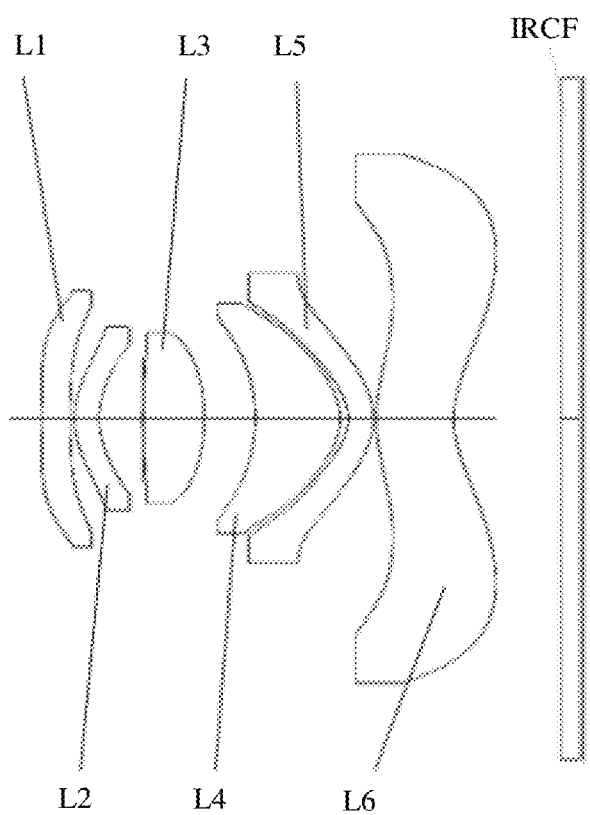

As shown in FIG. 3a and FIG. 3b, in a camera module in this implementation, a first lens L1, a second lens L2, a stop STO, a third lens L3, a fourth lens L4, and a fifth lens L5, a sixth lens L6, an infrared filter element IRCF, and an electronic image sensor are sequentially arranged along an optical axis from an object side to an image side. The electronic image sensor can be placed on a position of an imaging surface S14 (also referred to as an image surface). In this implementation, the stop STO is placed after the second lens L2, and is close to a middle position of the camera module, to help balance an aberration of the camera module.

The first lens L1 has a positive refractive power and is made of a resin material. A region, near the optical axis, of an object-side surface S1 of the first lens L1 is concave. A region, near the optical axis, of an image-side surface S2 of the first lens L1 is convex. Both the regions are aspheric surfaces.

The second lens L2 has a negative refractive power and is made of a resin material. A region, near the optical axis, of an object-side surface S3 of the second lens L2 is convex. A region, near the optical axis, of an image-side surface S4 of the second lens L2 is convex. Both the regions are aspheric surfaces.

The third lens L3 has a positive refractive power and is made of a resin material. A region, near the optical axis, of an object-side surface S5 of the third lens L3 is convex. A region, near the optical axis, of an image-side surface S6 of the third lens L3 is concave. Both the regions are aspheric surfaces.

The fourth lens L4 has a positive refractive power and is made of a resin material. A region, near the optical axis, of an object-side surface S7 of the fourth lens L4 is concave. A region, near the optical axis, of an image-side surface S8 of the fourth lens L4 is concave. Both the regions are aspheric surfaces.

The fifth lens L5 has a negative refractive power and is made of a resin material. A region, near the optical axis, of an object-side surface S9 of the fifth lens L5 is concave. A region, near the optical axis, of an image-side surface S110 of the fifth lens L5 is concave. Both the regions are aspheric surfaces.

The sixth lens L6 has a negative refractive power and is made of a resin material. A region, near the optical axis, of an object-side surface S11 of the sixth lens L6 is concave. A region, near the optical axis, of an image-side surface S12 of the sixth lens L6 is convex. Both the regions are free-form surfaces.

In Embodiment 2, a distance on the optical axis between the object-side surface S1 of the first lens L1 and an imaging surface S14 of an infinitely far-away object is TTL, and an effective focal length of the camera module is EFL. The following condition can be met: TTL/EFL≤2, to implement shorter TTL, thereby facilitating miniaturization design of the camera module, saving internal space of a terminal device, and facilitating thinning development of the terminal device.

In Embodiment 2, the exponents of x and y in $E_i$ of the surface type expression of the free-form surface of the sixth lens L6 are both even numbers. This can make the surface type of the lens better symmetric, and facilitate lens processing and detection.

In an extension of Embodiment 2, optionally, a vignetting stop ST1 (not shown) may be disposed before (namely, on the object side of) the first lens L1, and a vignetting stop ST2 (not shown) may be disposed after (on the image side of) the sixth lens L6, to effectively reduce a diameter of the camera module.

In Embodiment 2, a focal length of the camera module is f, a curvature radius of the object-side surface S11 of the sixth lens L6 is R61, and a curvature radius of the image-side surface S12 of the sixth lens L6 is R62. The following condition is met: |f/R61|+|f/R62|=0.71, to help correct a comprehensive aberration of a camera set, so that a lateral chromatic aberration of the camera module is less than 3 um and a distortion is less than 2%.

Table 2a is a table showing characteristics of an optical system in this embodiment. A curvature radius and a thickness are both expressed in millimeters (mm).

TABLE 2a

| Surface number | Surface type | Curvature radius | Thickness | Material | Refractive index | Dispersion coefficient | Material |
|---|---|---|---|---|---|---|---|
| S1 | Aspheric surface | −2.3847 | 0.3458 | Resin | 1.65 | 22.9 | EP7000 |
| S2 | Aspheric surface | 1.8127 | 0.0363 | | | | |
| S3 | Aspheric surface | 1.458 | 0.2855 | Resin | 1.67 | 19.243 | EP9000 |
| S4 | Aspheric surface | 3.0075 | 0.5178 | | | | |
| STO | Flat surface | Infinite | −0.0091 | | | | |
| S5 | Aspheric surface | 47.486 | 0.7245 | Resin | 1.54 | 55.99 | APL5014CL |
| S6 | Aspheric surface | −2.3808 | 0.6004 | | | | |
| S7 | Aspheric surface | −7.4388 | 0.9962 | Resin | 1.54 | 55.99 | APL5014CL |
| S8 | Aspheric surface | −1.4872 | 0.096 | | | | |
| S9 | Aspheric surface | −1.0653 | 0.2928 | Resin | 1.67 | 19.243 | EP9000 |
| S10 | Aspheric surface | −1.6155 | 0.0363 | | | | |
| S11 | Extended aspheric surface | −0.2474 | 0.9056 | Resin | 1.65 | 22.9 | EP7000 |
| S12 | Extended aspheric surface | 1.6942 | 1.2628 | | | | |
| S13 | Flat surface | Infinite | 0.2096 | Glass | 1.52 | 54.5 | D263T |
| | Flat surface | Infinite | 0.0499 | | | | |
| S14 | Flat surface | Infinite | 0 | | | | |

Table 2b gives conic coefficients k and polynomial coefficients a1, a2, a3, a4, a5, a6, a7, a8, a9, a10, a11, a12, a13, a14, and a15 that can be used for aspheric lenses surfaces S1 to S10 in Embodiment 2.

TABLE 2b

| Parameter | S1 | S2 | S3 | S4 | S5 | S6 | S7 | S8 | S9 | S10 |
|---|---|---|---|---|---|---|---|---|---|---|
| K | −20.2834 | −2.3818 | −6.3801 | −57.3023 | −100.0000 | 0.3347 | 23.0097 | −0.5407 | −0.6057 | −0.7241 |
| a1 | 0.0000 | 0.0000 | 0.0000 | 0.0000 | 0.0000 | 0.0000 | 0.0000 | 0.0000 | 0.0000 | 0.0000 |
| a2 | 0.3807 | −1.1425 | −0.0770 | 0.6250 | 0.1903 | 0.1292 | −0.4347 | −0.8528 | −0.9073 | −0.5643 |
| a3 | 0.0540 | 1.0089 | 0.8594 | 0.2524 | 0.0154 | 0.0458 | 0.2969 | 1.1047 | 1.4486 | 0.3965 |
| a4 | 0.2938 | −0.0461 | −0.9054 | −0.1618 | −0.1345 | −0.4954 | −0.2717 | 0.7216 | 0.8305 |
| a5 | −0.0688 | −0.0713 | 0.6027 | −0.0884 | 0.0204 | 0.6727 | −0.1883 | 0.1518 | −0.3589 | −0.5759 |
| a6 | −0.0549 | −0.3815 | −0.8218 | 1.7311 | 0.0268 | −0.9452 | 0.2630 | 0.0884 | −0.0851 | −0.2502 |
| a7 | −0.0334 | 0.3001 | −1.0009 | −3.0152 | −0.3675 | −0.5039 | 0.3214 | −0.1407 | −0.1323 | 0.0253 |
| a8 | 0.0225 | 0.3473 | 1.0333 | −8.5801 | −0.5188 | 1.2010 | 0.5801 | −0.3391 | −0.1651 | 0.2075 |
| a9 | 0.0821 | −0.3709 | −0.5461 | −0.0307 | 0.4198 | 0.1419 | 0.0467 | −0.2976 | −0.0121 | 0.1278 |
| a10 | 0.0606 | 0.1619 | −0.6811 | 47.1165 | −3.5227 | 0.0874 | −0.7888 | −0.1074 | −0.0245 | 0.0155 |
| a11 | −0.0499 | −0.1433 | 1.7402 | −1.9290 | 3.3752 | −5.1732 | −0.3589 | −0.0821 | −0.0951 | 0.0291 |
| a12 | −0.0466 | −0.0746 | 1.4197 | −54.5390 | 10.0663 | −10.3682 | −0.1919 | −0.0458 | −0.0297 | −0.0061 |
| a13 | −0.0083 | 0.0858 | 1.4019 | −16.3711 | 10.5950 | 13.9387 | −0.3328 | −0.1357 | −0.0921 | −0.0237 |
| a14 | 0.0474 | −0.2141 | −0.1854 | −50.7892 | −12.5135 | 25.7124 | 0.5221 | −0.0465 | 0.3056 | −0.0251 |
| a15 | 0.0322 | −0.2401 | −1.3685 | 15.2032 | −156.0708 | 9.4206 | 0.7632 | 0.2883 | 0.4513 | −0.0132 |
| a16 | −0.0819 | 0.4074 | −2.0867 | 193.8807 | 170.3787 | −57.1594 | 1.0040 | 0.9630 | 0.3100 | 0.0046 |

Table 2C gives conic coefficients k and higher-order term coefficients X2Y0, X0Y2, X4Y0, X2Y2, X0Y4, X6Y0, X4Y2, X2Y4, X0Y6, X8Y0, X6Y2, X4Y4, X2Y6, and X0Y8 that can be used for the free-form surfaces S11 and S12 in Embodiment 2.

TABLE 2c

| Parameter | S11 | S12 |
|---|---|---|
| K | −1.0178 | −4.3499 |
| X2Y0 | 6.5795 | 0.0633 |
| X0Y2 | 6.5725 | 0.0489 |
| X4Y0 | −1.725 | −0.2768 |
| X2Y2 | −3.4771 | −0.5611 |
| X0Y4 | −1.7136 | −0.2535 |
| X6Y0 | 0.4593 | 0.1003 |
| X4Y2 | 1.6453 | 0.4314 |
| X2Y4 | 1.527 | 0.3351 |
| X0Y6 | 0.4794 | 0.0951 |
| X8Y0 | 0.1257 | 0.0157 |
| X6Y2 | −0.2977 | −0.2672 |
| X4Y4 | 0.028 | −0.1712 |
| X2Y6 | −0.0265 | −0.1196 |
| X0Y8 | 0.0337 | −0.0193 |

Figure 3C:
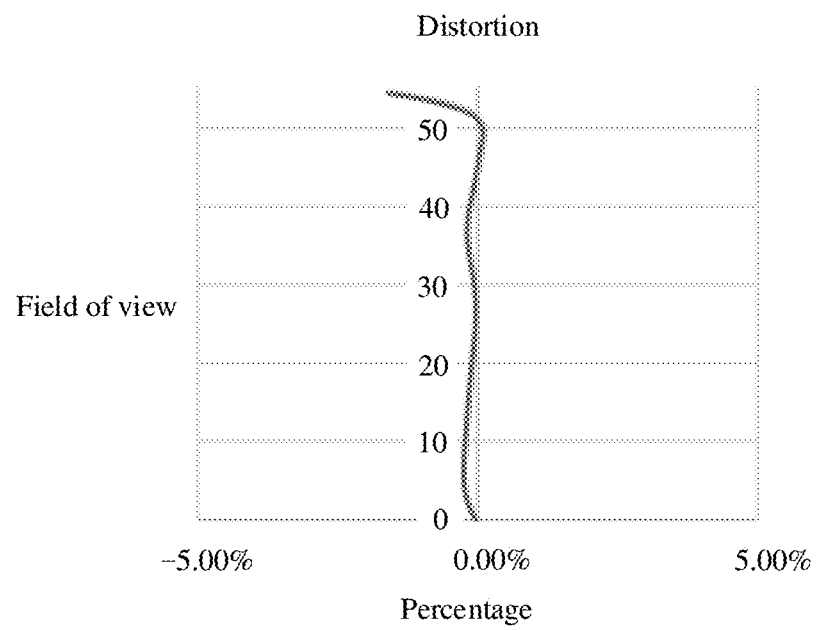
FIG. 3c is a distortion curve of an optical system in Embodiment 2.

FIG. 3c shows a distortion curve of the optical system in Embodiment 2, which represents distortion values corresponding to different fields of view.

Figure 3D:
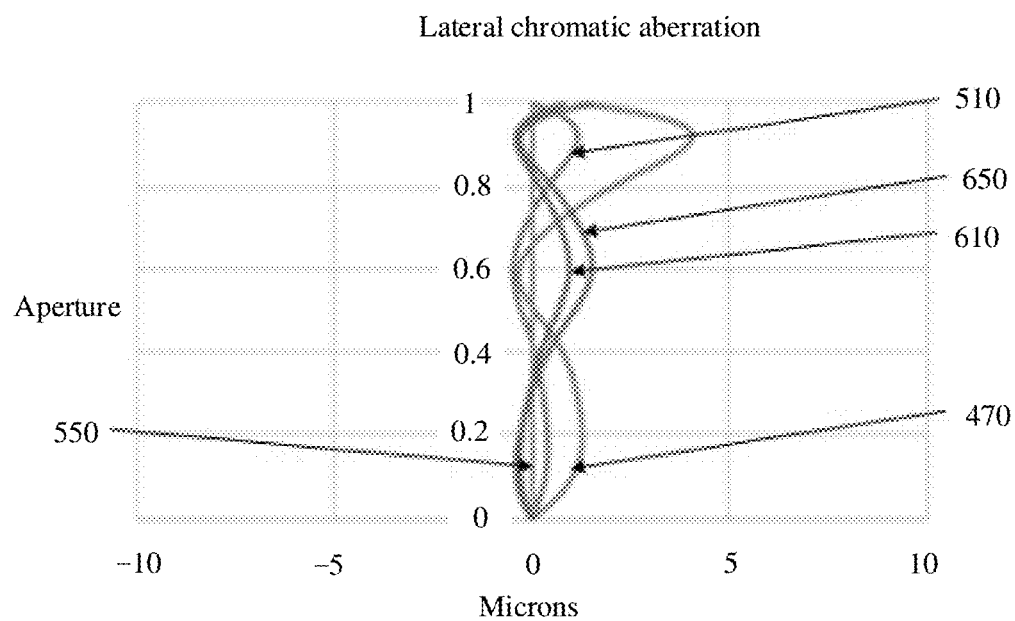
FIG. 3d is a lateral chromatic aberration curve of an optical system in Embodiment 2.

FIG. 3d shows a lateral chromatic aberration curve of the optical system in Embodiment 2, which represents lateral chromatic aberration values corresponding to five different wavelengths of light at different fields of view. Arrow indication lines are used to represent the five different wavelengths of light. The wavelengths are 510 nanometers, 470 nanometers, 610 nanometers, 550 nanometers, and 650 nanometers, respectively.

It can be learned from FIG. 3c and FIG. 3d that the optical system provided in Embodiment 2 can achieve good imaging quality.

Embodiment 3

Figure 4A:
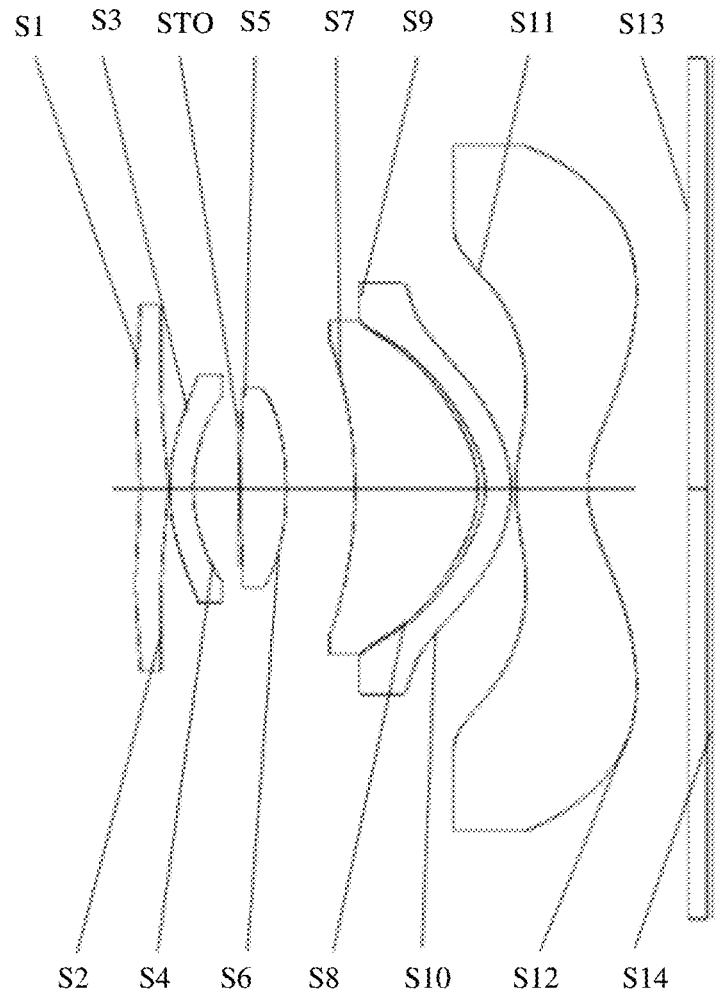
FIG. 4a and FIG. 4b are schematic diagrams of a camera module according to Embodiment 3 of this application.
Figure 4B:
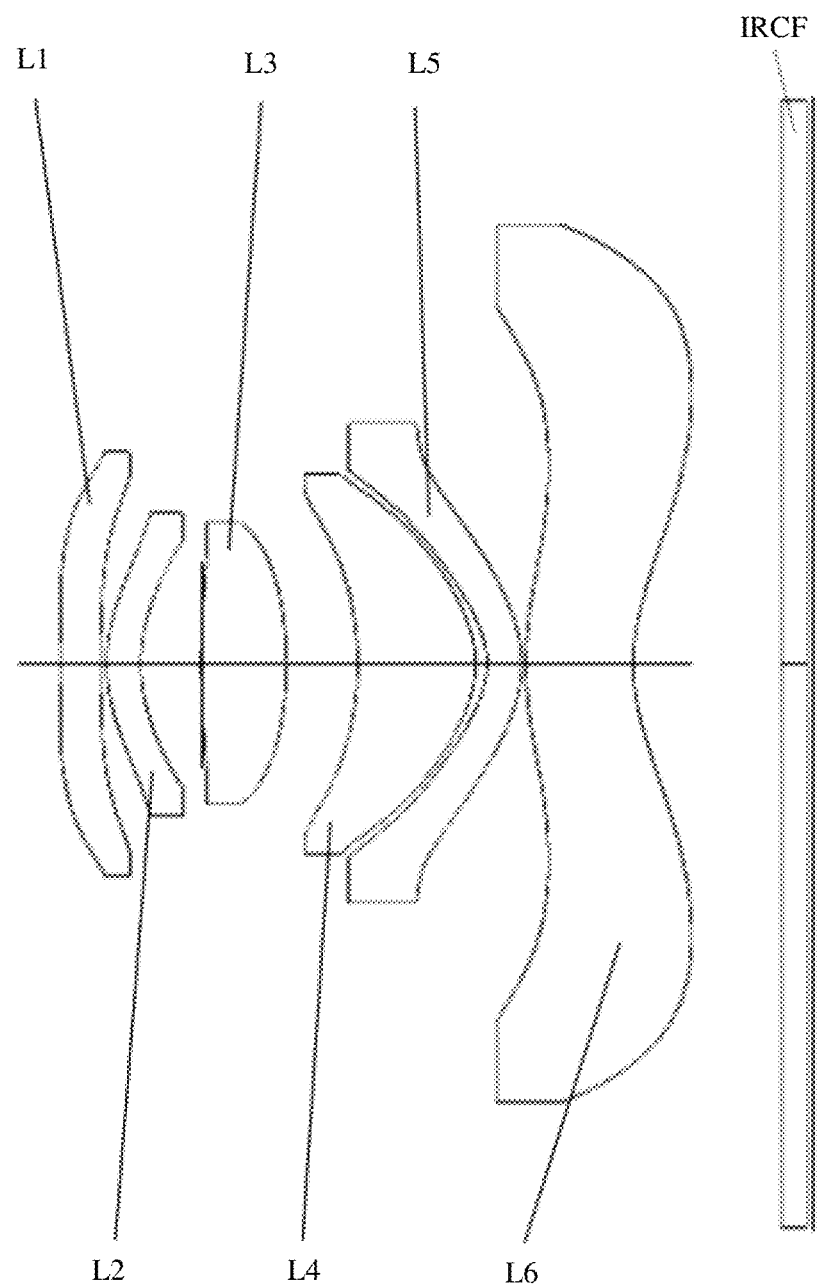

As shown in FIG. 4a and FIG. 4b, in a camera module in this implementation, a first lens L1, a second lens L2, a stop STO, a third lens L3, a fourth lens L4, and a fifth lens L5, a sixth lens L6, an infrared filter element IRCF, and an electronic image sensor are sequentially arranged along an optical axis from an object side to an image side. The electronic image sensor can be placed on a position of an imaging surface S14.

The first lens L1 has a positive refractive power and is made of a resin material. A region, near the optical axis, of an object-side surface S1 of the first lens L1 is concave. A region, near the optical axis, of an image-side surface S2 of the first lens L1 is convex. Both the regions are aspheric surfaces.

The second lens L2 has a negative refractive power and is made of a resin material. A region, near the optical axis, of an object-side surface S3 of the second lens L2 is convex. A region, near the optical axis, of an image-side surface S4 of the second lens L2 is convex. Both the regions are aspheric surfaces.

The third lens L3 has a positive refractive power and is made of a resin material. A region, near the optical axis, of an object-side surface S5 of the third lens L3 is convex. A region, near the optical axis, of an image-side surface S6 of the third lens L3 is concave. Both the regions are aspheric surfaces.

The fourth lens L4 has a positive refractive power and is made of a resin material. A region, near the optical axis, of an object-side surface S7 of the fourth lens L4 is concave. A region, near the optical axis, of an image-side surface S8 of the fourth lens L4 is concave. Both the regions are aspheric surfaces.

The fifth lens L5 has a negative refractive power and is made of a resin material. A region, near the optical axis, of an object-side surface S9 of the fifth lens L5 is concave. A region, near the optical axis, of an image-side surface S110 of the fifth lens L5 is concave. Both the regions are aspheric surfaces.

The sixth lens L6 has a negative refractive power and is made of a resin material. A region, near the optical axis, of an object-side surface S11 of the sixth lens L6 is concave. A region, near the optical axis, of an image-side surface S12 of the sixth lens L6 is convex. Both the regions are free-form surfaces.

In Embodiment 3, a distance on the optical axis between the object-side surface S1 of the first lens L1 and an imaging surface S14 of an infinitely far-away object is TTL, and an effective focal length of the camera module is EFL. The following condition can be met: TTL/EFL≤2, to implement shorter TTL, thereby facilitating miniaturization design of the camera module, saving internal space of a terminal device, and facilitating thinning development of the terminal device.

In Embodiment 3, the exponents of x and y in $E_i$ of the surface type expression of the free-form surface of the sixth lens L6 are both even numbers, which makes the surface type of the lens better symmetric, and facilitates lens processing and detection.

In an extension of Embodiment 3, optionally, a vignetting stop ST1 (not shown) may be disposed before (namely, on the object side of) the first lens L1, and a vignetting stop ST2 (not shown) may be disposed after (on the image side of) the sixth lens L6, to effectively reduce a diameter of the camera module.

In Embodiment 3, a focal length of the camera module is f, a curvature radius of the object-side surface S11 of the sixth lens L6 is R61, and a curvature radius of the image-side surface S12 of the sixth lens L6 is R62. The following condition is met: |f/R61|+|f/R62|=1.92, to help correct a comprehensive aberration of a camera set, so that a lateral chromatic aberration of the camera module is less than 3 um and a distortion is less than 2%.

Table 3a is a table showing characteristics of an optical system in this embodiment. A curvature radius and a thickness are both expressed in millimeters (mm).

TABLE 3a

| Surface number | Surface type | Curvature radius | Thickness | Material | Refractive index | Dispersion coefficient | Material |
|---|---|---|---|---|---|---|---|
| S1 | Aspheric surface | −3.1589 | 0.2953 | Resin | 1.65 | 22.9 | EP7000 |
| S2 | Aspheric surface | 3.5364 | 0.0237 | | | | |
| S3 | Aspheric surface | 1.7330 | 0.2483 | Resin | 1.65 | 22.9 | EP7000 |

TABLE 3a-continued

| Surface number | Surface type | Curvature radius | Thickness | Material | Refractive index | Dispersion coefficient | Material |
|---|---|---|---|---|---|---|---|
| S4 | Aspheric surface | 3.3108 | 0.4889 | | | | |
| STO | Flat surface | Infinite | 0.0136 | | | | |
| S5 | Aspheric surface | 19.8218 | 0.4821 | Resin | 1.54 | 56 | APL5014CL |
| S6 | Aspheric surface | −2.5251 | 0.7337 | | | | |
| S7 | Aspheric surface | −10.0889 | 1.3051 | Resin | 1.54 | 56 | APL5014CL |
| S8 | Aspheric surface | −1.5229 | 0.0760 | | | | |
| S9 | Aspheric surface | −1.4148 | 0.2782 | Resin | 1.65 | 22.9 | EP7000 |
| S10 | Aspheric surface | −1.9785 | 0.0500 | | | | |
| S11 | Extended aspheric surface | −2.2632 | 0.7622 | Resin | 1.65 | 22.9 | EP7000 |
| S12 | Extended aspheric surface | 0.8529 | 1.0613 | | | | |
| S13 | Flat surface | Infinite | 0.2100 | Glass | 1.52 | 54.5 | D263T |
| | Flat surface | Infinite | 0.0500 | | | | |
| S14 | Flat surface | Infinite | 0.0000 | | | | |

Table 3b gives conic coefficients k and polynomial coefficients a1, a2, a3, a4, a5, a6, a7, a8, a9, a10, a11, a12, a13, a14, and a15 that can be used for aspheric lenses surfaces S1 to S10 in Embodiment 3.

TABLE 3b

| Parameter | S1 | S2 | S3 | S4 | S5 | S6 | S7 | S8 | S9 | S10 |
|---|---|---|---|---|---|---|---|---|---|---|
| K | −19.1982 | −6.7071 | −10.5697 | −94.8320 | −92.1353 | −1.8945 | 39.5657 | −0.6213 | −0.6096 | −0.5025 |
| a1 | 0.0000 | 0.0000 | 0.0000 | 0.0000 | 0.0000 | 0.0000 | 0.0000 | 0.0000 | 0.0000 | 0.0000 |
| a2 | 0.0956 | −0.9439 | −0.1502 | 0.4913 | 0.0435 | 0.1196 | −0.1316 | −0.3738 | −0.6654 | −0.5632 |
| a3 | 0.1720 | 0.6845 | 0.5477 | 0.2394 | 0.0128 | 0.0550 | −0.0684 | 0.1254 | 0.8416 | 0.6787 |
| a4 | 0.0986 | 0.1394 | −0.5466 | −0.6546 | −0.0759 | −0.5139 | 0.2599 | 0.3174 | 0.5371 | −0.0965 |
| a5 | −0.1024 | −0.0329 | 0.8873 | 0.4402 | 0.3706 | 0.5159 | −0.4902 | −0.4410 | | |
| a6 | −0.0022 | −0.5623 | −0.1384 | 2.7731 | 0.0413 | −0.6119 | −0.1841 | 0.0359 | −0.1847 | −0.0280 |
| a7 | −0.0098 | 0.1792 | −0.9765 | 0.4146 | −0.4024 | 0.2886 | 0.2694 | −0.3266 | 0.0420 | 0.0990 |
| a8 | −0.0333 | 0.3229 | 0.6770 | −9.6616 | −0.2291 | 0.4303 | 0.6533 | −0.3749 | −0.0774 | 0.2199 |
| a9 | 0.0279 | −0.2649 | −1.2748 | −1.5490 | 0.6105 | −1.1976 | 0.1466 | −0.2612 | 0.0200 | 0.0806 |
| a10 | 0.0284 | 0.2324 | −1.1899 | 32.7032 | −2.3182 | −0.8407 | −0.6587 | −0.0882 | 0.0473 | −0.0266 |
| a11 | −0.0325 | −0.1094 | 1.5365 | −15.6447 | 3.9257 | −3.4558 | −0.2067 | 0.0396 | −0.0928 | 0.0011 |
| a12 | −0.0176 | −0.1524 | 2.5773 | −61.9447 | 7.7852 | −5.5869 | −0.1438 | 0.0833 | −0.0936 | −0.0157 |
| a13 | 0.0005 | 0.1188 | 1.7996 | 17.9166 | −0.9105 | 15.6206 | 0.1141 | 0.0908 | −0.0681 | −0.0193 |
| a14 | 0.0203 | 0.0183 | −0.9110 | 88.2484 | 7.6825 | 24.6383 | 0.3079 | 0.0386 | −0.0172 | −0.0141 |
| a15 | 0.0196 | 0.0024 | −2.7400 | 131.1438 | −159.2654 | 2.0639 | 0.4387 | 0.0331 | 0.0679 | −0.0040 |
| a16 | −0.0192 | −0.0171 | −1.9357 | −227.7872 | 166.8148 | −66.9990 | −0.4919 | 0.0731 | 0.1369 | 0.0094 |

Table 3c gives conic coefficients k and higher-order term coefficients X2Y0, X0Y2, X4Y0, X2Y2, X0Y4, X6Y0, X4Y2, X2Y4, X0Y6, X8Y0, X6Y2, X4Y4, X2Y6, and X0Y8 that can be used for the free-form surfaces S11 and S12 in Embodiment 3.

TABLE 3c

| Parameter | S11 | S12 |
|---|---|---|
| K | −0.7265 | −2.3120 |
| X2Y0 | 1.2459 | −0.4049 |
| X0Y2 | 1.2611 | −0.3527 |
| X4Y0 | −1.2282 | −0.1014 |
| X2Y2 | −2.5043 | −0.4262 |
| X0Y4 | −1.1911 | −0.1977 |
| X6Y0 | 0.9985 | 0.0226 |
| X4Y2 | 2.8791 | 0.3820 |
| X2Y4 | 2.6747 | 0.4401 |
| X0Y6 | 0.7212 | 0.1124 |
| X8Y0 | −0.5561 | 0.0280 |
| X6Y2 | −1.7777 | −0.1859 |
| X4Y4 | −1.6110 | −0.1588 |
| X2Y6 | −0.9485 | −0.1983 |
| X0Y8 | −0.0621 | −0.0308 |

Figure 4C:
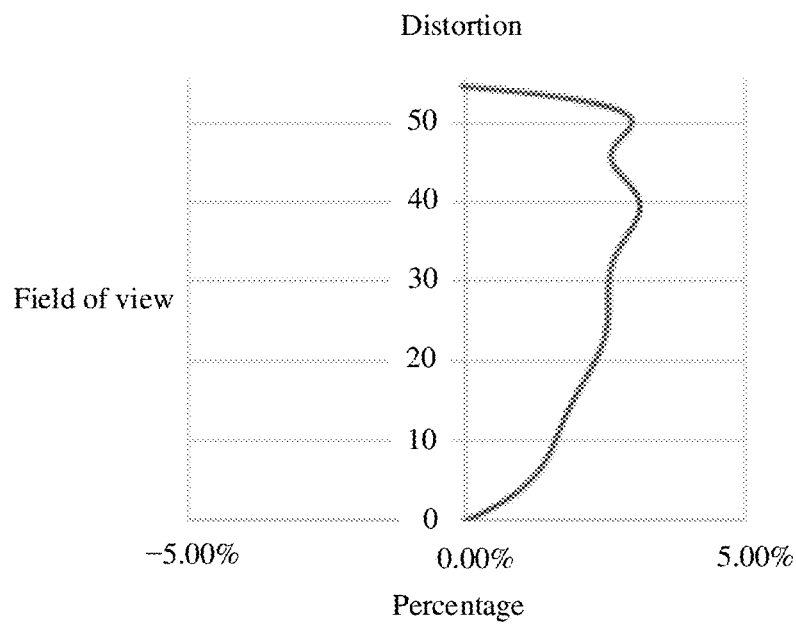
FIG. 4c is a distortion curve of an optical system in Embodiment 3.

FIG. 4C shows a distortion curve of the optical system in Embodiment 3, which represents distortion values corresponding to different fields of view.

Figure 4D:
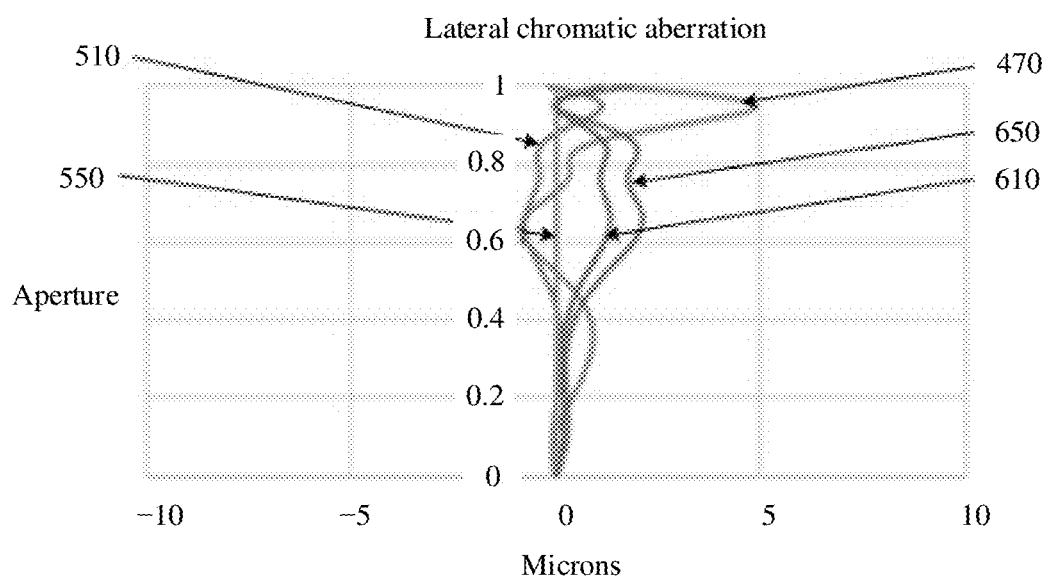
FIG. 4d is a lateral chromatic aberration curve of an optical system in Embodiment 3.

FIG. 4d shows a lateral chromatic aberration curve of the optical system in Embodiment 3, which represents lateral chromatic aberration values corresponding to five different wavelengths of light at different fields of view. Arrow indication lines are used to represent the five different wavelengths of light. The wavelengths are 510 nanometers, 470 nanometers, 610 nanometers, 550 nanometers, and 650 nanometers, respectively.

It can be learned from FIG. 4c and FIG. 4d that the optical system provided in Embodiment 3 can achieve good imaging quality.

Example embodiments of this application are described above. It should be noted that a person of ordinary skill in the art may further make several improvements and modifications without departing from the principle of this application, and these improvements and modifications are also considered to be within the protection scope of this application.

What is claimed is:

1. A camera module, comprising:
a plurality of lenses, wherein lenses of the plurality of lenses are sequentially arranged from an object side to an image side along a direction of an optical axis, wherein at least one of the plurality of lenses is a free-form lens, wherein the free-form lens is a non-rotationally symmetric lens, wherein a first lens of the plurality of lenses is a lens of the plurality of lenses nearest the object side in a direction from the object side to the image side, wherein a distance on the optical axis between an object-side surface of the first lens and an imaging surface is TTL, wherein an effective focal length of the camera module is EFL, wherein TTL/EFL≤2.0, and wherein a lateral chromatic aberration of the camera module is less than 3 µm and a distortion is less than 2%;
wherein one or more of an object-side surface or an image-side surface of the free-form lens are free-form surfaces, and wherein a surface type expression of the free-form lens is:

$$z = \frac{c_x x^2 + c_y y^2}{1 + \sqrt{1 - (1 + k_x) c_x^2 x^2 - (1 + k_y) c_y^2 y^2}} + \sum_{i=1}^{M} A_i |x^i| + \sum_{i=1}^{M} B_i |y^i|$$

wherein z is a sag of an optical surface, wherein x is an X-axis coordinate, and y is a Y-axis coordinate, wherein $k_x$ and $k_y$ are conic coefficients, wherein $c_x$ and $c_y$ are curvature radii, and wherein $A_i$ and $B_i$ are polynomial coefficients.

2. The camera module according to claim 1, wherein the free-form lens is symmetric with respect to a first plane, and wherein the free-form lens is also symmetric with respect to a second plane; and
wherein the first plane is a plane comprising an X-axis and the optical axis, wherein the second plane is a plane comprising a Y-axis and the optical axis, and wherein the X-axis and the Y-axis are two central axes that are perpendicular to each other on the imaging surface of the camera module.

3. The camera module according to claim 2, wherein the X-axis and the Y-axis are each central axes passing through a center of the imaging surface and are respectively parallel to a long side and a short side of the imaging surface.

4. The camera module according to claim 3, wherein a quantity of lenses of the plurality of lenses is N, wherein N≥3, and wherein the plurality of lenses comprise the first lens to an Nth lens sequentially arranged in the direction from the object side to the image side; and
wherein surfaces of object-side surfaces and image-side surfaces of the first lens to an (N−1)th lens are all aspheric surfaces, and wherein the Nth lens is a free-form lens.

5. The camera module according to claim 2, wherein a half of a diagonal length of an effective pixel region on the imaging surface of the camera module is ImgH, and wherein TTL/ImgH≤2.0.

6. The camera module according to claim 2, wherein an entrance pupil diameter of the camera module is EPD, and wherein EFL/EPD≤2.2.

7. The camera module according to claim 2, wherein a field of view of the camera module is FOV, wherein FOV>100 degrees, and wherein EFL<20 mm.

8. The camera module according to claim 1, wherein a quantity of the plurality of lenses is N, wherein three lenses that are of the plurality of lenses and that are nearest the object side are arranged sequentially in the direction from the object side to the image side and are, respectively, the first lens, a second lens, and a third lens; and
wherein the camera module further comprises a vignetting stop, and wherein the vignetting stop is disposed on an object side of the second lens or on an object side of the third lens.

9. The camera module according to claim 1, wherein a lens of the plurality of lenses adjacent to the imaging surface is the free-form lens, wherein a curvature radius of the object-side surface of the free-form lens is R61, wherein a curvature radius of an image-side surface of the free-form lens is R62, and wherein |EFL/R61|+| EFL/R62|<2.

10. The camera module according to claim 1, further comprising an electronic image sensor, wherein the electronic image sensor is disposed on the imaging surface, and wherein the imaging surface of the camera module is a rectangular region that matches an image sensing area of the electronic image sensor and is not less than the image sensing area of the electronic image sensor.

11. The camera module according to claim 10, wherein a diagonal length of an image sensing surface of the electronic image sensor is not less than 5.5 mm.

12. A terminal device, comprising:
a camera module, comprising a plurality of lenses having lenses sequentially arranged from an object side to an image side along a direction of an optical axis, wherein at least one lens of the plurality of lenses is a free-form lens, wherein the free-form lens is a non-rotationally symmetric lens, wherein a first lens of the plurality of lenses is a lens of the plurality of lenses nearest the object side in a direction from the object side to the image side, wherein a distance on the optical axis between an object-side surface of the first lens and an imaging surface is TTL, wherein an effective focal length of the camera module is EFL, wherein TTL/EFL≤2.0, and wherein a lateral chromatic aberration of the camera module is less than 3 µm and a distortion is less than 2%;
wherein one or more of an object-side surface or an image-side surface of the free-form lens are free-form surfaces, and wherein a surface type expression of the free-form lens is:

$$z = \frac{c_x x^2 + c_y y^2}{1 + \sqrt{1 - (1+k_x)c_x^2 x^2 - (1+k_y)c_y^2 y^2}} + \sum_{i=1}^{M} A_i |x^i| + \sum_{i=1}^{M} B_i |y^i|$$

wherein z is a sag of an optical surface, wherein x is an X-axis coordinate, and y is a Y-axis coordinate, wherein $k_x$ and $k_y$ are conic coefficients, wherein $c_x$ and $c_y$ are curvature radii, and wherein $A_i$ and $B_i$ are polynomial coefficients.

13. The terminal device according to claim 12, wherein the free-form lens is symmetric with respect to a first plane, and wherein the free-form lens is symmetric with respect to a second plane; and wherein the first plane is a plane comprising an X-axis and the optical axis, wherein the second plane is a plane comprising a Y-axis and the optical axis, and wherein the X-axis and the Y-axis are each central axes that are perpendicular to each other on the imaging surface of the camera module.

14. A device, comprising:

a plurality of lenses having lenses, including a first lens and a free-form lens, sequentially arranged from an object side to an image side along a direction of an optical axis;

wherein the free-form lens is spaced apart from the first lens, wherein the first lens of the plurality of lenses is a lens of the plurality of lenses nearest the object side in a direction from the object side to the image side, wherein a distance on the optical axis between an object-side surface of the first lens and an imaging surface is TTL, wherein an effective focal length of the device is EFL, and wherein TTL/EFL≤2.0, and wherein a lateral chromatic aberration of the device is less than 3 μm and a distortion is less than 2%; and wherein one or more of an object-side surface or an image-side surface of the free-form lens are free-form surfaces, and wherein a surface type expression of the free-form lens is:

$$z = \frac{c_x x^2 + c_y y^2}{1 + \sqrt{1 - (1+k_x)c_x^2 x^2 - (1+k_y)c_y^2 y^2}} + \sum_{i=1}^{M} A_i |x^i| + \sum_{i=1}^{M} B_i |y^i|$$

wherein z is a sag of an optical surface, wherein x is an X-axis coordinate, and y is a Y-axis coordinate, wherein $k_x$ and $k_y$ are conic coefficients, wherein $c_x$ and $c_y$ are curvature radii, and wherein $A_i$ and $B_i$ are polynomial coefficients.

15. The device according to claim 14, wherein the free-form lens is non-rotationally symmetric and is symmetric with respect to a first plane and symmetric with respect to a second plane different from the first plane; and wherein the first plane is a plane comprising an X-axis and the optical axis, wherein the second plane is a plane comprising a Y-axis and the optical axis, and wherein the X-axis and the Y-axis are two central axes that are perpendicular to each other on the imaging surface.

16. The device according to claim 15, wherein a quantity of lenses of the plurality of lenses is N, wherein N≥3, and wherein the plurality of lenses comprise the first lens to an Nth lens sequentially arranged in the direction from the object side to the image side; and wherein surfaces of object-side surfaces and image-side surfaces of the first lens to an (N−1)th lens are all aspheric surfaces, and wherein the Nth lens is the free-form lens.

17. The device according to claim 15, wherein the X-axis and the Y-axis are each central axes passing through a center of the imaging surface and are respectively parallel to a long side and a short side of the imaging surface.

18. The device according to claim 14, wherein a half of a diagonal length of an effective pixel region on the imaging surface of the device is ImgH, and wherein TTL/ImgH≤2.0.

19. The device according to claim 14, wherein a lens of the plurality of lenses adjacent to the imaging surface is the free-form lens, wherein a curvature radius of the object-side surface of the free-form lens is R61, wherein a curvature radius of an image-side surface of the free-form lens is R62, and wherein | EFL/R61|+| EFL/R62|<2.

* * * * *

UNITED STATES PATENT AND TRADEMARK OFFICE
CERTIFICATE OF CORRECTION

| | | |
|---|---|---|
| PATENT NO. | : 12,413,836 B2 | Page 1 of 1 |
| APPLICATION NO. | : 17/633859 | |
| DATED | : September 9, 2025 | |
| INVENTOR(S) | : Ye et al. | |

It is certified that error appears in the above-identified patent and that said Letters Patent is hereby corrected as shown below:

In the Claims

In Column 20, in Claim 7, Line 21, delete "FOV>100" and insert -- FOV≥100 --.

In Column 20, in Claim 9, Line 37, delete "| EFL/R62|<2." and insert -- |EFL/R62|<2. --.

In Column 22, in Claim 19, Line 40, delete "| EFL/R61|+| EFL/R62|<2." and insert -- |EFL/R61|+|EFL/R62|<2. --.

Signed and Sealed this
Twenty-first Day of October, 2025

John A. Squires
*Director of the United States Patent and Trademark Office*